Figure 1:
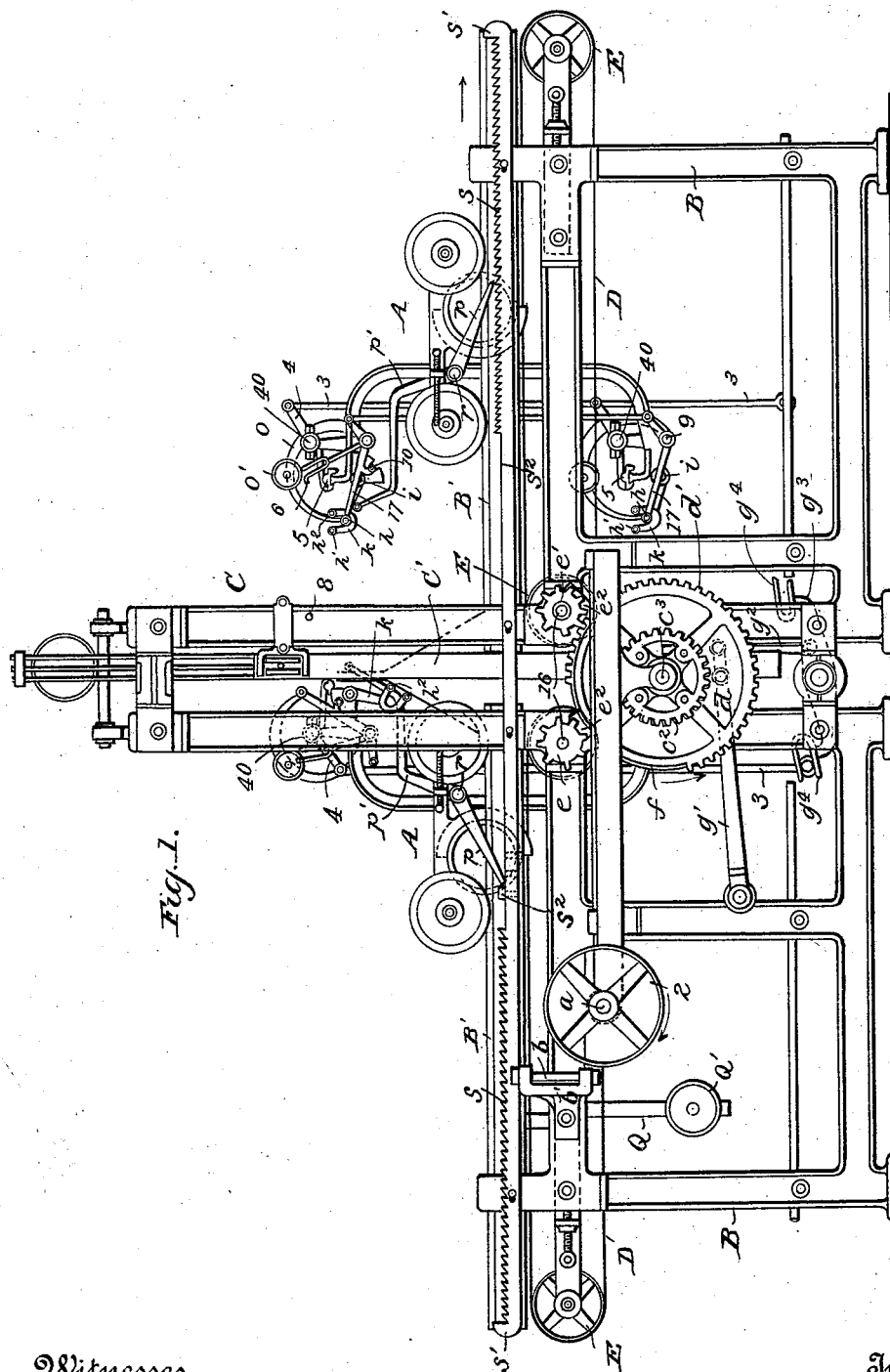

(No Model.) 8 Sheets—Sheet 1.

A. GASS.
EMBROIDERING MACHINE.

No. 549,776. Patented Nov. 12, 1895.

Witnesses
I. A. Fairgrieve
A. N. Dotson

Inventor
Alexander Gass
by J. Foster Freeman
Attorneys (No Model.) 8 Sheets—Sheet 4.

A. GASS.
EMBROIDERING MACHINE.

No. 549,776. Patented Nov. 12, 1895.

Witnesses
J. A. Fairgrieve
A. N. Dobson

Inventor
Alexander Gass
by
Foster Freeman
Attorneys (No Model.)  
8 Sheets—Sheet 5.

A. GASS.
EMBROIDERING MACHINE.

No. 549,776.  
Patented Nov. 12, 1895.

Witnesses  
I. A. Fairgrieve  
A. N. Dobson

Inventor  
Alexander Gass  
by Foster Freeman  
Attorneys

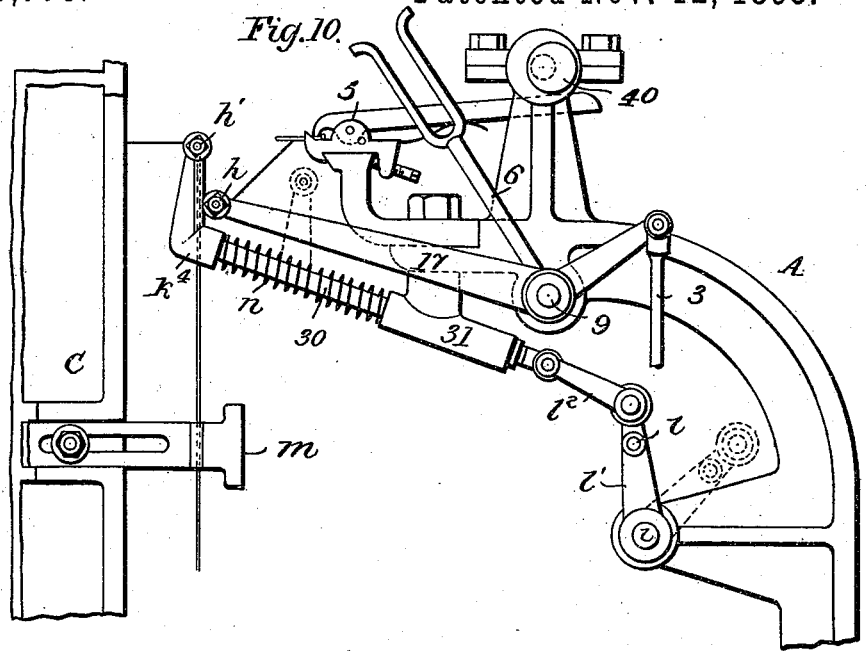

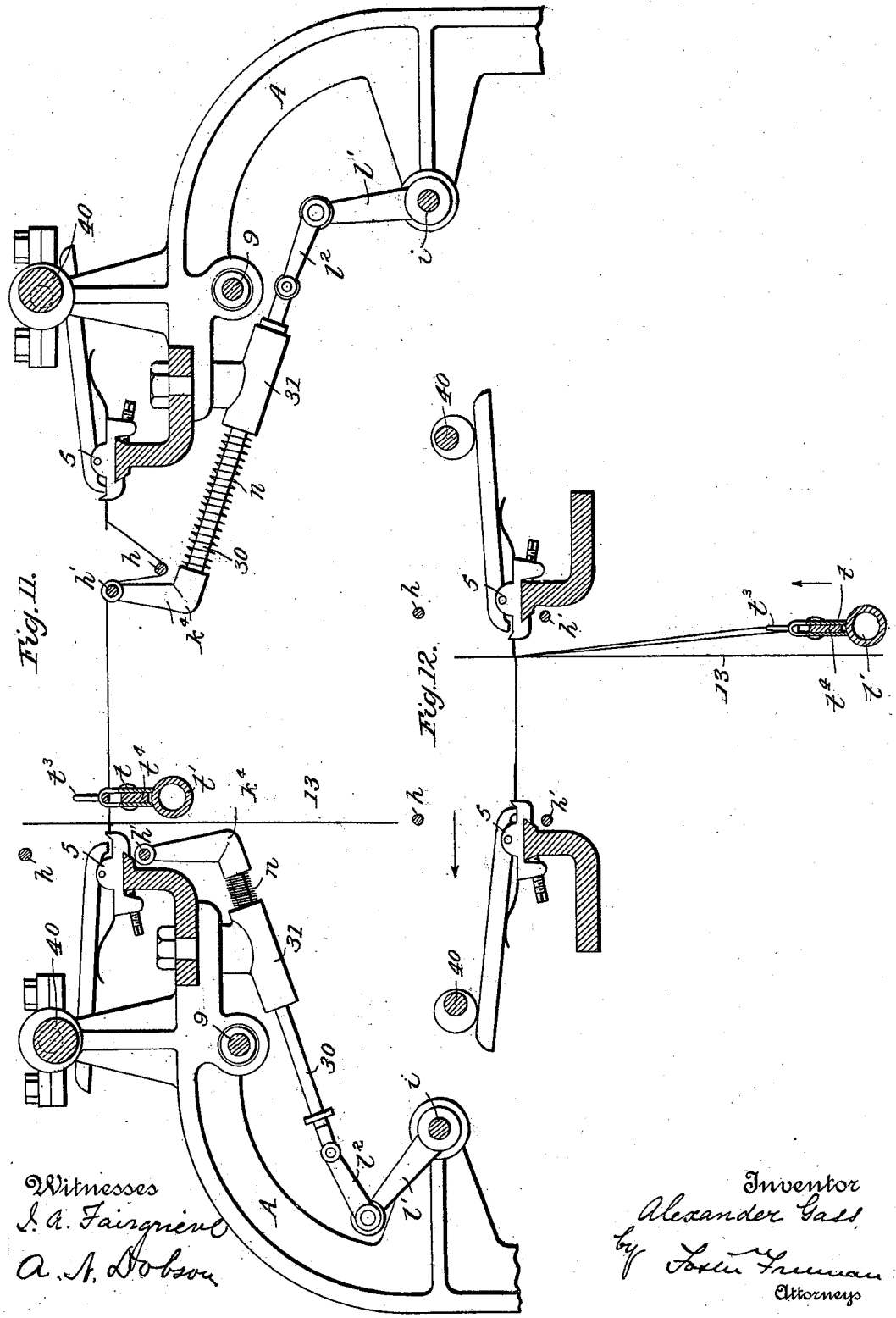

(No Model.) 8 Sheets—Sheet 8.

A. GASS.
EMBROIDERING MACHINE.

No. 549,776. Patented Nov. 12, 1895.

Witnesses
J. A. Fairgrieve
A. N. Dobson

Inventor
Alexander Gass
by Foster Freeman
Attorneys

UNITED STATES PATENT OFFICE.

ALEXANDER GASS, OF BELFAST, IRELAND.

EMBROIDERING-MACHINE.

SPECIFICATION forming part of Letters Patent No. 549,776, dated November 12, 1895.

Application filed August 22, 1894. Serial No. 521,024. (No model.)

*To all whom it may concern:*

Be it known that I, ALEXANDER GASS, of 17 College Street south, in the city of Belfast and county of Antrim, in that part of the United Kingdom of Great Britain and Ireland called Ireland, have invented certain new and useful Improvements in Machines for Embroidering Cloth and other Fabrics; and I do hereby declare the following to be a specification thereof.

My invention relates to improvements in embroidering-machines of the ordinary double-pointed multiple-needle type in which the needles carry threads of limited lengths passing through eyes in the middle of the needles, and which needles are transferred from one set or row of holders or grippers to another, such holders being mounted in carriages which are arranged upon opposite sides of the embroidery-frame, the latter being suspended and balanced in the usual way and guided by a pantograph.

The invention consists of mechanisms whereby the machine is entirely automatic in its operation, thus greatly lessening the manual labor required of the attendants who operate the machine and increasing the productive capacity of the machine.

More particularly the invention consists of improvements in the automatic driving mechanism whereby the carriages are moved toward and from the embroidery-frame and are held stationary when in position to have the needle holders or grippers release and again grasp the needles, and in improvements in the automatic mechanism whereby the needle-grippers are opened and closed.

The invention further consists in the means whereby the driving mechanism is automatically reversed in order to change the direction of the movement of the carriage or carriages at the proper times.

The invention further consists in a tension device whereby the proper tension is automatically given to the thread, so that it is properly drawn through the fabric, and, further, in the combination of such tension device with the reversing mechanism, whereby when the proper tension has been given to the thread the machine is automatically reversed, no matter what be the length of the thread.

The invention further consists in a take-up apparatus by means of which the thread after the stitches have been formed in the fabric is so disposed as to prevent entanglement thereof, and at the same time give sufficient slack for the passage of the needle to the back or rear carriage and a proper movement of such carriage; and the invention further consists in other combinations and arrangements of the parts of the apparatus to be presently set forth.

In the accompanying drawings I have shown means for carrying my invention into practical effect, without, however, limiting my improvements in their useful applications to the particular construction of machine which for the sake of illustration I have delineated.

As I have chosen for the sake of illustrating my invention a form of embroidering-machine which is well known in the art, I have not deemed it necessary to illustrate in detail all of the parts of such machine, particularly those which are well known and common in the art, as they may be of any usual or preferred construction.

Figure 2:
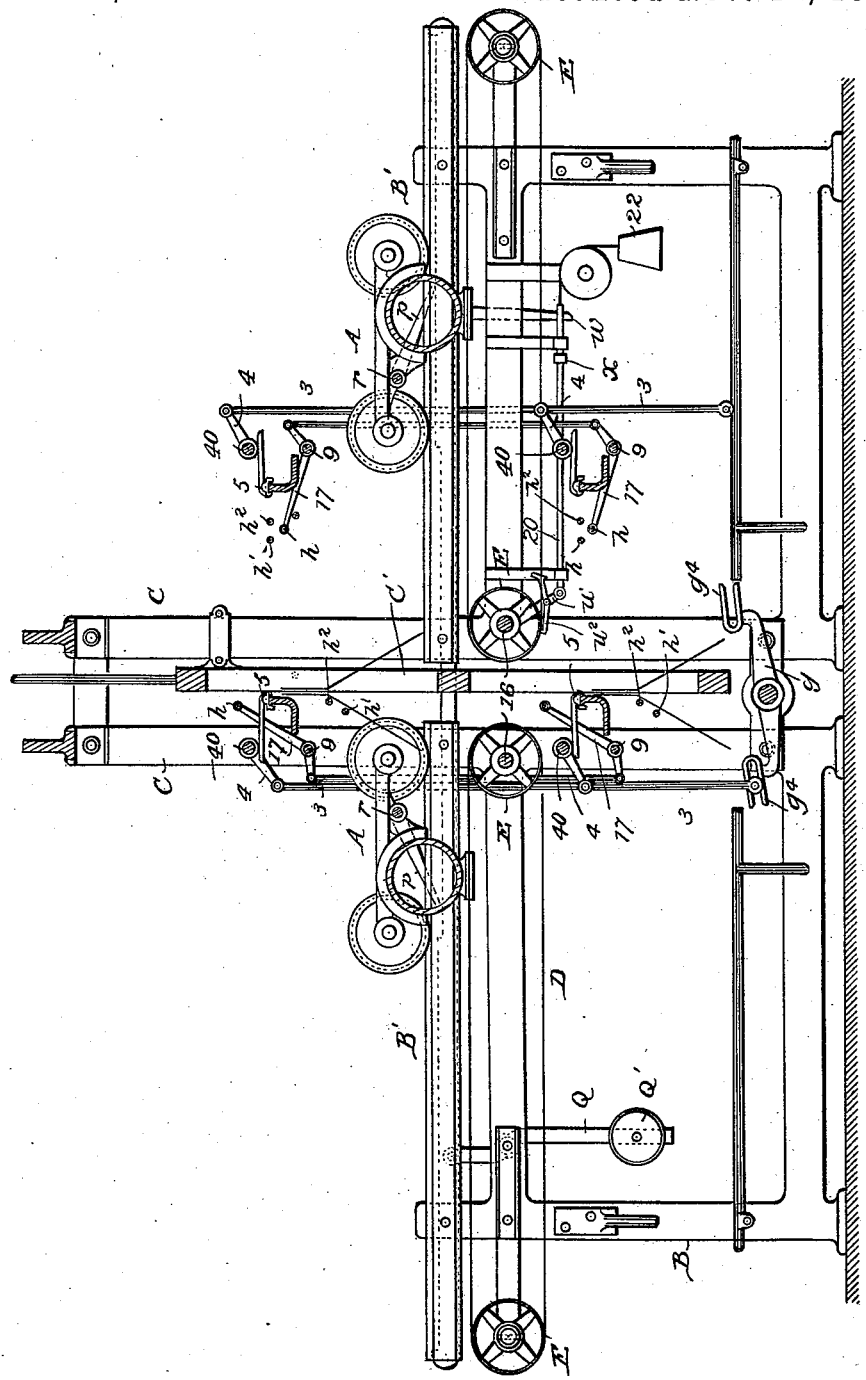
Figure 3:
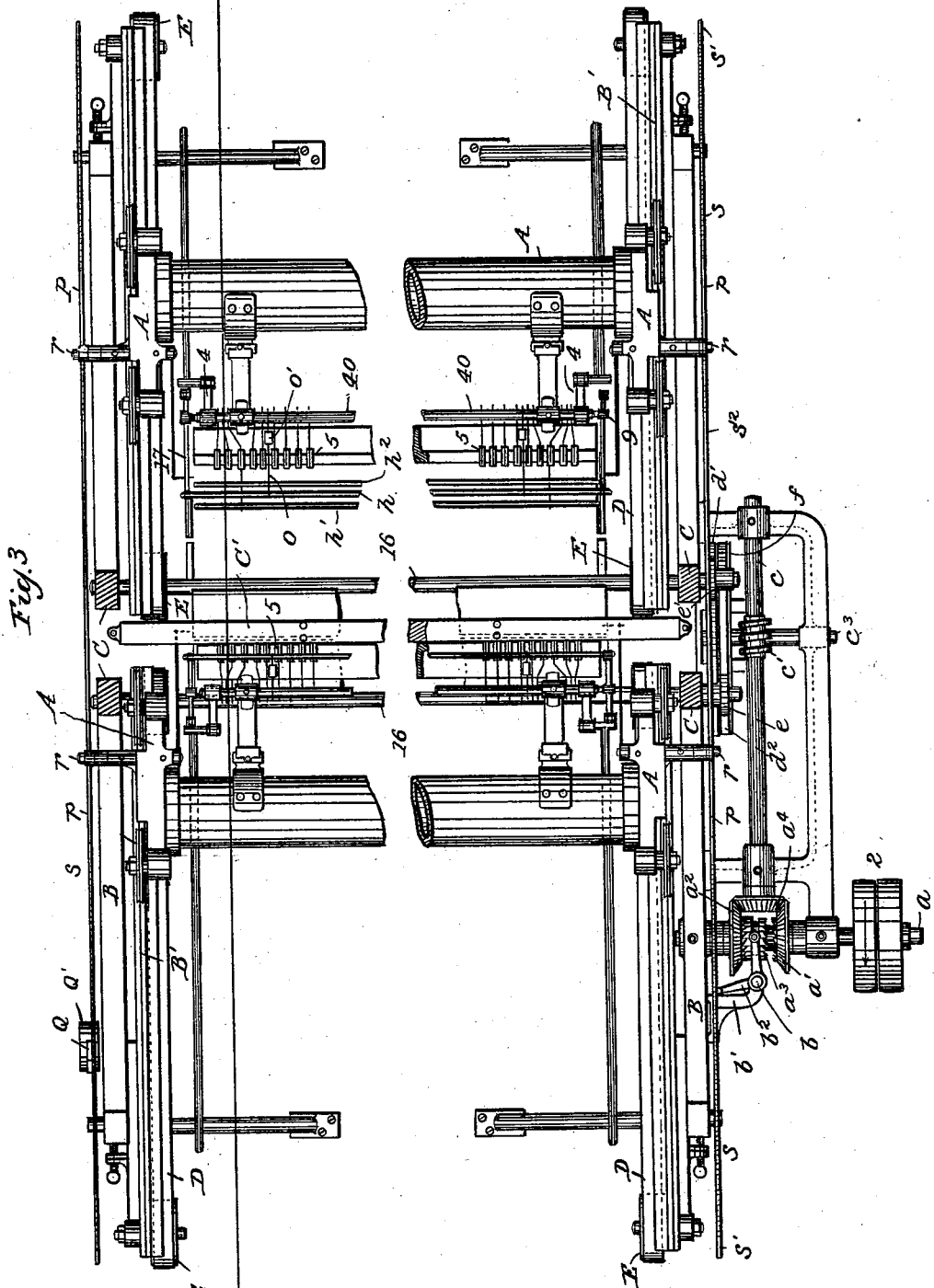
Figure 4:
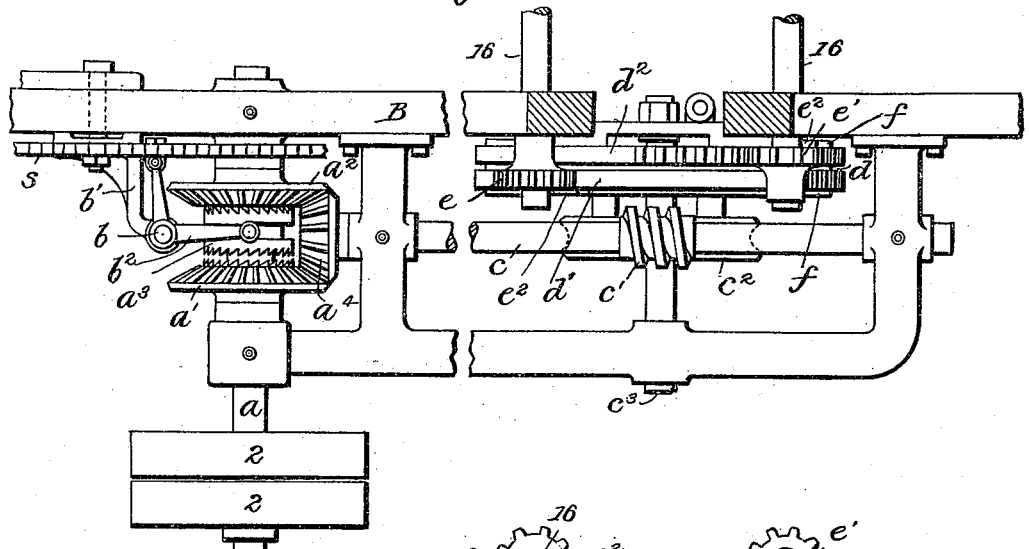
Figure 5:
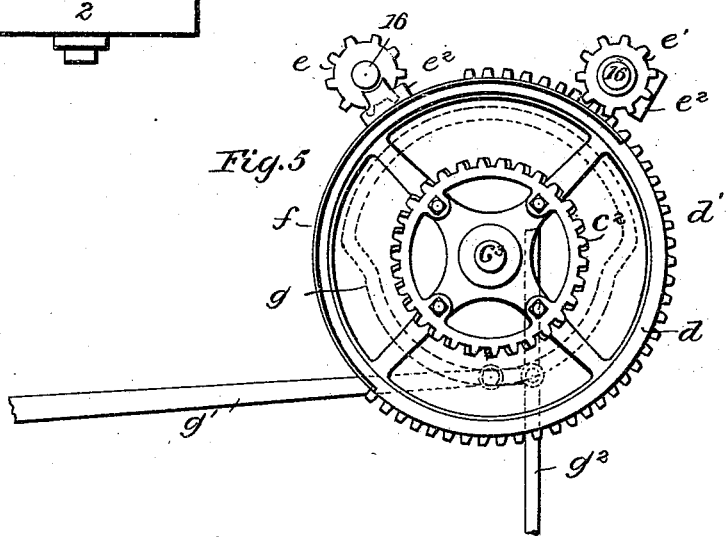
Figure 6:
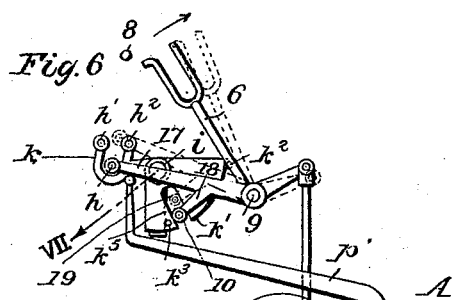
Figure 7:
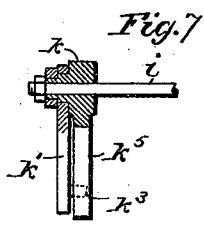
Figure 8:
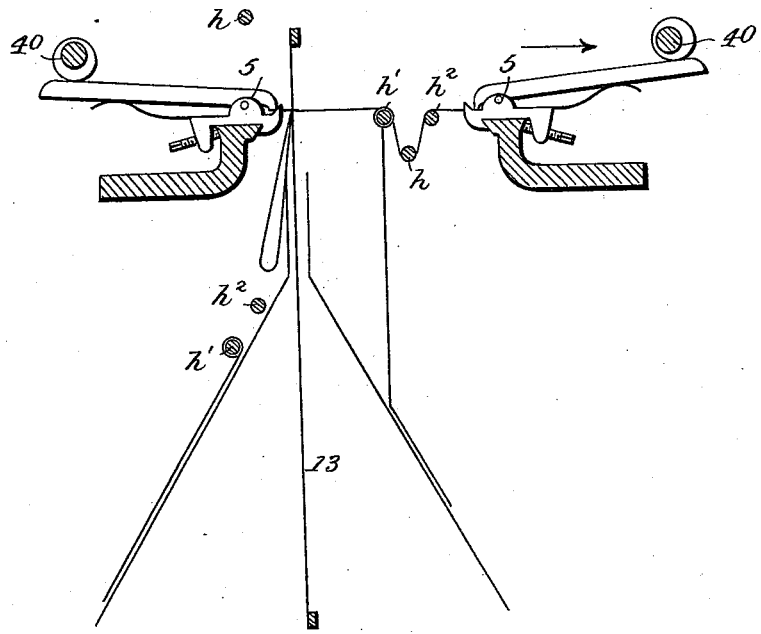
Figure 9:
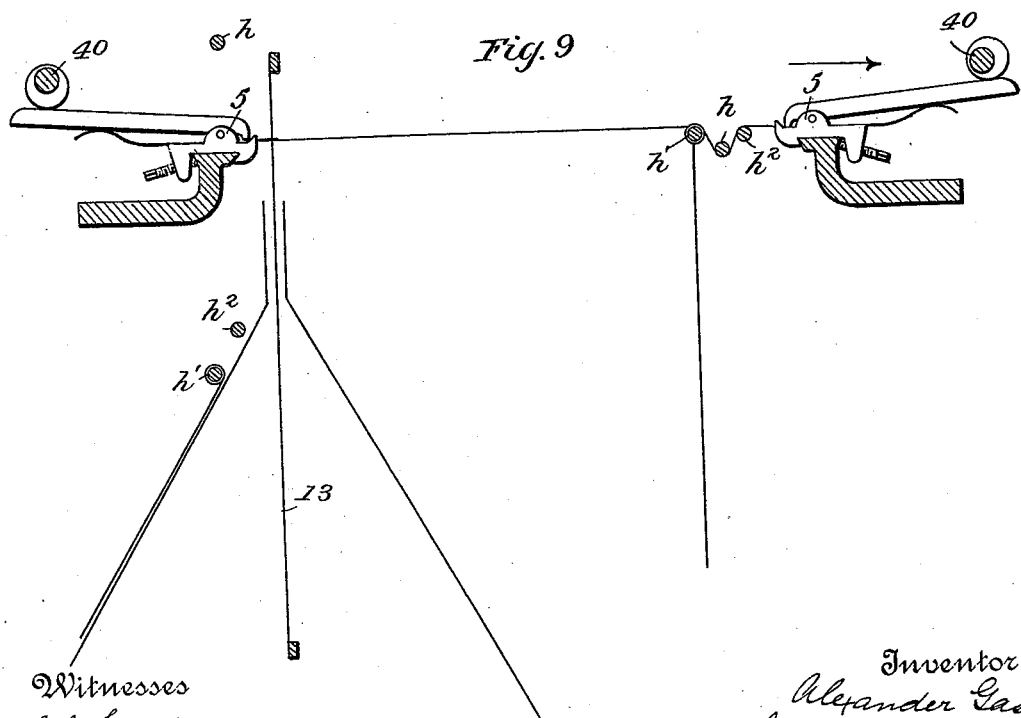
Figure 16:
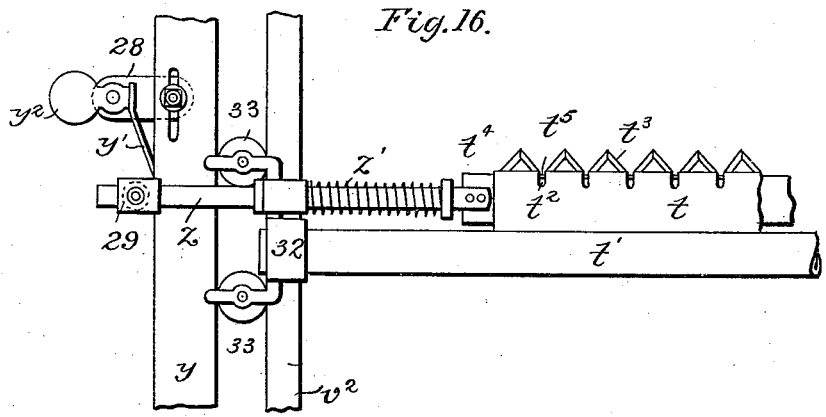
Figure 17:
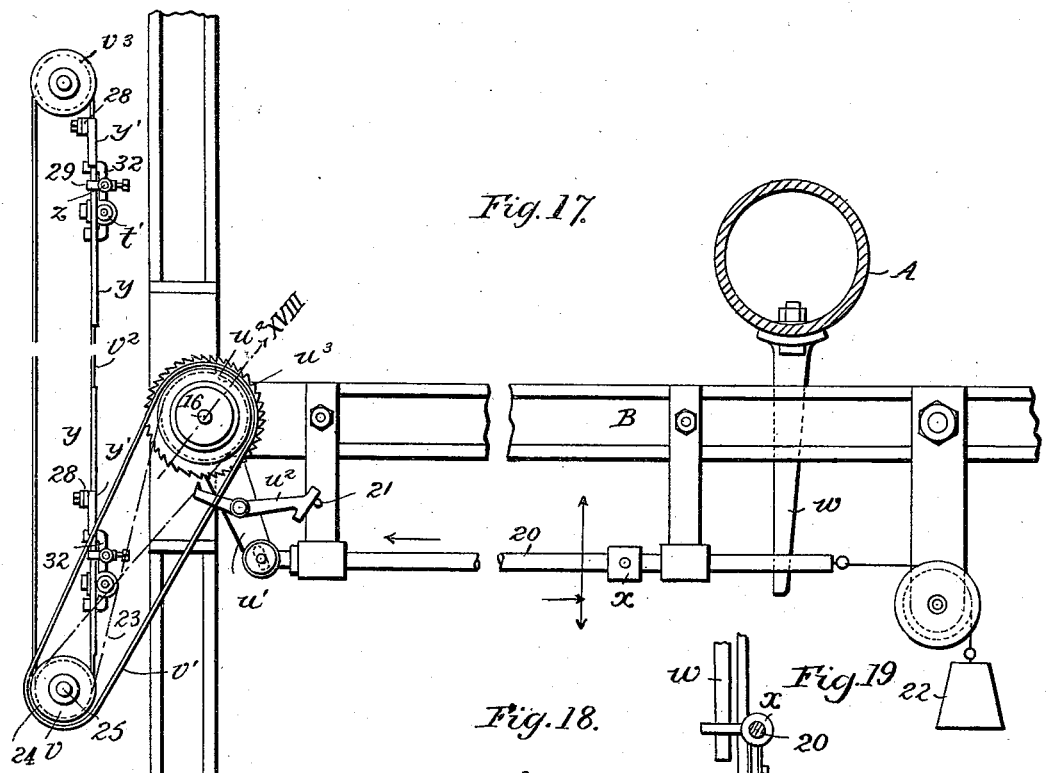
Figure 18:
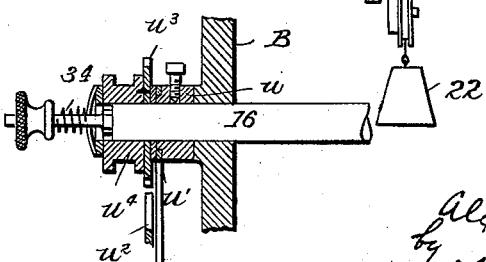
Figure 19:
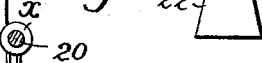

In the accompanying drawings, Figure 1 is a side elevation of a machine having my improvements applied thereto. Fig. 2 is a central vertical section of the same, parts being broken away. Fig. 3 is a top plan view, partly in section, and the central portion of the machine being broken away. Fig. 4 is a plan view, on a larger scale, of the driving mechanism of the machine, parts being broken away. Fig. 5 is an elevation of a portion of the said driving mechanism. Fig. 6 is a side view of the automatic tension devices and parts of the reversing mechanism. Fig. 7 is a detail sectional view on the line VII of Fig. 6. Figs. 8 and 9 are sectional views, diagrammatic in character, illustrating two different positions of the grippers, the thread, and the tension devices. Fig. 10 is a side view of a form of the tension devices different from that shown in the figures heretofore described. Fig. 11 is a sectional elevation illustrating the two sets of grippers and the form of tensioning device shown in Fig. 10, the take-up device being also shown in section and in its uppermost position. Fig. 12 is a diagrammatic view of the same parts, showing the take-up device moved away from the grippers. Fig. 13 is a view similar in character to Fig. 10, but illustrating the parts in different positions. Fig. 14 is a front elevation, partly broken away; and Fig. 15 is a sectional view of the take-up device. Fig. 16 is an elevation of the mechanism for opening and closing the thread-eyes in the take-up device and for guiding the take-up. Fig. 17 is an end view of the take-up apparatus and the means for operating the same. Fig. 18 is a detail sectional view taken on the line XVIII of Fig. 17. Fig. 19 is a detail sectional view taken on the line XIX of Fig. 17.

In the said drawings, B represents the framework of the machine, upon the top rails B' B' of which travel the carriages A A, in which are mounted the grippers for receiving and carrying the needles, such carriages being arranged upon opposite sides of the raised central portion C of the framework, in which is hung the embroidery-frame C' in the usual manner. The carriages receive their motions directly from the driving belts or chains D, which pass over the pulleys E, or from other suitable mechanism.

I have shown the carriages A as being provided each with two sets of grippers or holders 5 for the needles, one set being arranged above the rails B' and the other below them. The two sets of grippers and the parts immediately associated therewith upon each frame are mainly duplicates one of the other, and are suitably connected so as to be operated simultaneously. I shall therefore describe but a single set.

$a$, Figs. 1, 3, and 4, represents the main driving-shaft of the machine, provided with the fast and loose belt-pulleys 2, which may be connected with any suitable motor. This shaft carries the two bevel-wheels $a'$ $a^2$, which run freely thereon and may be alternately engaged by the sliding clutch $a^3$, connected so as to turn with the shaft by a feather.

The clutch-shifting lever $b^2$, by means of which the clutch $a^3$ is brought into engagement with one or the other of the bevel-wheels $a'$ $a^2$, is of bell-crank form and is carried by a shaft $b$, supported in a bracket $b'$, secured to one side of the frame of the machine. One end of the bell-crank lever $b^2$ is connected with a toothed shifting-bar $s$, which extends from end to end of the frame of the machine, and is so mounted that it may be moved to a limited extent in the direction of its length. This shifting-bar $s$ is provided with ratchet-teeth near either end, but is plain or untoothed near its middle portion, for a purpose which will be hereinafter described. As this bar is operated whenever it is desired to reverse the driving mechanism, it will hereinafter be called the "reversing-bar."

Between the bevel-wheels $a'$ and $a^2$ there is mounted a bevel-pinion $a^4$, supported upon a shaft $c$ at right angles to the shaft $a$ and parallel with the side of the frame. This shaft carries a worm $c'$, which gears into and drives a worm-wheel $c^2$, that is mounted upon a shaft $c^3$ and has secured to it a double-faced mutilated gear-wheel $d$, preferably as illustrated in Figs. 1, 3, 4, and 5. As indicated in Figs. 3 and 4, this wheel $d$ has its rim or face divided into two parts $d'$ and $d^2$, each part being provided throughout a portion of its circumference with gear-teeth, with which engage, respectively, the pinions $e$ and $e'$, mounted upon the driving-shafts 16 of the carriages. Each one of these shafts 16 carries one of the turning wheels E, around which passes a driving-belt D.

By reason of the gear-sections $d'$ and $d^2$ extending only part of the way around the circumference of the wheel the contact between these teeth and the pinions which they drive is intermittent and ceases when the pinions have been revolved a sufficient number of times to return the carriages to the inner limits of their stroke or travel. The wheel $d$ is provided with the two delay-rims $f$, which rims are concentric with the wheel and project outward from the opposite sides or faces thereof, each being arranged a short distance back from its edge or toward the center of the wheel, as shown in Fig. 5, and with these rims engage the saddles or delay-shoes $e^2$, secured to the pinions $e$ $e'$, the engagement of each delay-shoe with the rim being while its associated pinion is out of engagement with the gear-section of the wheel, and operating to lock the carriages when they arrive at the inward limits of their movements, holding them stationary and steady until the proper times come for them to recommence their travels, because there can be no turning of the shaft 16 when the delay-shoes which are secured thereto are in engagement with the rim. As shown in the drawings, each delay-rim extends about half way round the wheel, the corresponding gear-section extending the other half way, the rim beginning where the gear-section terminates and ending where the gear begins. It thus follows that as soon as the gear-section ceases operating upon the pinion the delay surface or rim comes into engagement with the delay shoe or saddle and locks the shaft by which both the gear-pinion and the delay-rim are carried, and that the moment the delay-rim passes beyond the saddle, thus unlocking the shaft and pinion, the gear-wheel section and the pinion come into operation again and operate to drive the carriage.

The grippers are automatically operated from the driving mechanism already described, and to that end the wheel $d$ is provided upon one face, preferably its rear face, with a cam-groove $g$, (see dotted lines in Fig. 5,) in which travels a roller carried by a lever $g'$, suitably pivoted to the frame and connected by a link $g^2$ with an oscillating lever $g^3$, the ends of which are forked, as at $g^4$ $g^4$. The needle holders or grippers 5 are opened and closed in the usual way from a cam-shaft 40, provided with an arm 4, from which extends the rod 3, having a pin or roller adapted to engage with the forked end $g^4$ of the tilting lever when the carriage approaches its inward movement, and to be moved thereby when the lever $g^3$ is tilted.

It will be seen by reference to Figs. 1 and 2 that there is one of the connecting-rods 3 for each of the carriages A, and that the two sets of grippers on each carriage are connected by the rod 3, so that all of the grippers upon one carriage are operated together.

It will be observed that the relation of the delay rims and shoes to the cam $g$ is such that the cam imparts movements to the devices for operating the grippers while the delay-shoes are in engagement with the rims. It results from this that the carriages are held locked while the needles are being transferred from the grippers or holders in one carriage to the grippers or holders in the other carriage.

When one carriage is in motion, as represented at the right-hand side of Fig. 1 of the drawings, the delay-rim $f$, which is associated with the gear-section $d'$, and the shoe $e^2$ of the pinion $e'$ are in contact and hold the carriage at the left stationary, while the gear-section $d$, engaging with the pinion $e'$, causes the carriage at the right to perform its outward and inward movements for the completion of a single stitch of the threads. As soon as the carriage which is in motion arrives at its mid-position the delay-rim $f$, which is associated with the gear-section $d^2$, comes into engagement with the shoe of the pinion $e'$ and stops the movement of the right-hand carriage, so that both of the carriages are held stationary while the grippers are opened and the needles transferred from one set of grippers to the other through the action of the cam $g$ and the parts associated therewith. Upon the completion of these needle-changing operations the delay-rim $f$, which is associated with the gear-section $d'$, passes from engagement with its delay-shoe and the gear-section $d'$ comes into engagement with its pinion $e$ and causes the carriage at the left-hand end of the machine to perform its outward and inward movements, the right-hand-end carriage in the meantime being held stationary by the engagement of its delay-rim with the shoe $e^2$.

I will next describe the mechanism whereby the proper tension may be given to the thread and will thereafter describe the reversing mechanism, because in the preferred form of my invention and that which is illustrated in the drawings the reversing mechanism is set off or operated by the tension devices whenever the threads have been drawn to the proper degree of tightness.

In the further description of this machine I shall, for the sake of convenience, refer to the right-hand carriage, Fig. 1, as the "forward carriage" and to the other carriage as the "rear carriage."

Each carriage may be provided with a set of tensioning devices for each set of needle holders or grippers, and in the drawings I have illustrated the machine as being thus provided; but when the machine is adapted to have the rear carriage travel but a short distance, as in that embodiment of my invention illustrated in the drawings and which will be presently described, it is not necessary that there should be tensioning devices carried by the rear-carriage frame. They may, however, be present and thrown out of operation, as shown in the drawings, in which event they will be ready for use should the machine be arranged to give full travel to the rear carriage as well as to the forward carriage. I will therefore in the description of the tensioning devices describe only those carried by the forward carriage, it being understood that when the rear carriage is provided with tensioning devices they are duplicates of those mounted upon the forward carriage.

The tensioning devices which I have devised are so arranged that they come into position as the carriage begins to recede from the fabric, the under rod rising to or near to a level with the needles and the top rod dropping between the needles and the under rod and carrying the thread with it, so that when the threads begin to tighten the top rod will be raised and the pawl-lever will drop into engagement with the toothed rail or reversing-bar, which operates to reverse the direction of the travel of the carriage when the tension operations have been completed—that is, when the threads have been completely drawn through the fabric—the devices being so arranged, however, that the thread can never be drawn perfectly taut or straight between the needles and the fabric, as there is always a yielding tension upon the threads, whereby danger of breaking or snapping them is greatly reduced.

I will first describe the form of tensioning devices shown in Figs. 1, 2, 3, 6, 8, and 9.

$h$ is a transverse rod extending across the machine and above the threads. It is supported by the arms 17, which are carried by the shafts or spindles 9, suitably mounted in the framework of the carriage A. A forked arm 6 is secured to one end of the said shaft or spindle 9, and is arranged to engage with and be moved by a pin 8, carried by the upright framework C of the machine whenever the carriage approaches close to the embroidery-frame, thus serving to rock the arms 17 and to raise the upper tension-rod $h$ out of the way of the needles as they approach the fabric and into the position indicated at the left-hand end of Fig. 1. The tension-rod $h$ is stayed by a number of curved arms $o$, Fig. 1, carried by the shaft 9, upon which arms are placed the adjustable weights $o'$ for the purpose of regulating the tension.

$h'$ and $h^2$ are transverse tension-rods arranged parallel to each other and to the rod $h$ and below the threads. They are secured to and supported by the arms $k$, which are free to turn on the shaft $i$, the arm $k$ at one end of the machine being provided with a tail-piece $k^5$, Figs. 6 and 7. A slotted segment-shaped plate or arm $k'$ is mounted loosely upon the shaft $i$ adjacent to the arm $k$, having the tail-piece, or upon the hub or boss of the arm $k$, as shown in Fig. 7. The segment-plate $k'$ co-operates, in a manner to be presently described, to hold the lower tension-rods in their raised and operative position, and is itself held in working position by a detent $k^2$, carried by the frame of the carriage, and, as shown in Fig. 6, consisting of a pin which is pressed into a recess in the edge of the plate. A pin $k^3$ is carried by the slotted segment and may be made to engage with the tail-piece $k^5$ of the arm $k$, thereby holding the arm and the tension-rods carried thereby up in working position whenever the plate is held in the position shown in Fig. 6.

One of the arms 17, supporting the upper tension-rod $h$, is provided with a short arm 18, carrying a roller 10, which enters the slot 19 in the segment $k'$.

Whenever the forked arm 6 is disengaged from the stop or pin 8, the devices connected with the upper tension-rod automatically assume the position shown in Figs. 1 and 6— that is to say, with the tension-rod $h$ bearing upon the thread between the rods $h'$ and $h^2$, as indicated at the right-hand end of Fig. 8— where they are held with a yielding force by the detent $k^2$. In assuming these positions the upper tension-rod moves down and the segment-plate $k'$ is moved thereby by reason of the engagement of the roller 10 with the walls of the slot 19, and the segment in turn moves the lower tension-rods and the parts which support them into their raised position by reason of the engagement of the pin $k^3$ with the tail-piece $k^5$.

As the forward carriage completes its travel in the direction away from the fabric, as indicated in Fig. 9, the upper tension-rod is moved from the position indicated in full lines in Fig. 6 and in Fig. 8 to that represented in Fig. 9, thus putting an additional tension upon the thread amounting to the weight of the parts which are thus lifted, but not permitting the thread to be drawn straight or taut between the fabric and the needles. This movement of the upper tension-rod takes place without changing the positions of the lower tension-rods by reason of the width of the slot 19, which is sufficient to permit a slight movement of the roller 10 therein without disturbing the segment $k'$.

When the forward carriage is completing its movement in the opposite direction—that is, toward the fabric—the forked arm 6 comes into contact with the stop 8 and is moved in the direction of the arrow in Fig. 6, the movement being sufficient in extent to carry the upper tension-rod out of the way of the needles which are approaching the material. At the same time the lower tension-rods are carried downward out of the way of the needles, this latter movement being effected by reason of the engagement of the roller 10 with the walls of the slot in the segment $k'$, and the tension devices now assume the positions indicated at the left-hand ends of Figs. 1, 8, and 9, in which positions they remain while the needles are being passed through the fabric and until they are again transferred to the holders of the forward or right-hand-end carriage and the backward movement of this carriage has commenced.

While I have shown in the drawings and have described the rod or rods $h'$ and $h^2$ as being arranged below the threads, and the rod $h$, which bears upon the threads with a yielding force and is the active element of the tension devices as being arranged above the threads, yet their positions might be reversed, the supporting-rods being above and the yielding tension-rod below the threads, without departing from the spirit of my invention. Such a change would amount to a mere reversal of the positions of parts without essentially changing their operations and would only require such minor changes in the connecting and operating parts as would readily suggest themselves to one skilled in the art.

In a machine provided with an automatic tension device such as I have just described it is desirable that there should be an automatic stopping of the machine and reversal of the movement of the carriage as soon as the proper tension has been put upon the thread and before it is drawn so tight as to break it or undesirably strain it. Such an automatic stopping and reversing mechanism is indicated in Figs. 1, 3, and 6 of the drawings, and consists of mechanism interposed between the shifting or reversing bar $s$ and the tension devices and operating to move the bar whenever the proper tension is put on the thread.

$p$ is a pawl or contact-arm arranged above the bar $s$ and adapted to engage with the teeth thereof. It is mounted upon the fulcrum-pin $r$ and is so weighted that when unsupported it will fall into engagement with the reversing-bar. An arm $p'$ is connected with the pawl $p$ and extends into position to be engaged by one member of the tension apparatus, preferably by one of the arms 17, which support the upper tension rod or bar $h$. Whenever this tension-rod is in its lowermost position, the pawl $p$ is lifted above the bar $s$ and out of engagement therewith; but whenever the tension-rod is raised above its lowermost position the pawl is allowed to fall and to engage with the reversing-bar.

It will be noted that the pawl $p$ and the arm $p'$ together constitute a lever which is interposed directly between the tension device and the reversing-bar of the reversing mechanism.

It will be understood that the forward carriage is still moving away from the fabric when the tension devices are brought into the positions indicated in Fig. 9, thereby putting the desired degree of tension upon the threads and causing the pawl $p$ to be brought into engagement with the reversing-bar. After the tension and reversing devices have been thus operated the further movement of the carriage away from the embroidery-frame is only sufficient to shift the reversing-bar and the clutch member connected therewith, but is not extensive enough to strain or snap the threads or tear the work before the reverse motion of the carriage begins.

As the carriage approaches the limit of its movement in the opposite direction, the upper tension-rod is lifted for the purpose of clearing it away from before the needles, and it is held in this position for some time and the pawl $p$ is allowed to fall and engage with the reversing-bar so long as the upper tension-rod is lifted. In order that the reversing mechanism shall not be operated as soon as the carriage begins its backward movement and while the tension-rod is held up by reason of the engagement of the arm 6 with the pin 8, I make the central portion $s^{12}$ of the reversing-bar plain or without teeth, so that the pawl will slide freely over it in either direction.

It will be observed that there is a projection $s'$ at the end of the reversing-bar, and this is for the purpose of causing the carriage to be automatically reversed when the threads have been first drawn out to their full length through the material and until they have gotten firmly held in the material and sufficiently shortened to permit the tensioning devices to begin to operate, after which the carriage is automatically reversed, whatever be the length of the threads, in the manner already described.

In Figs. 10 and 11 there is shown a form of tension device which differs from that described, and which in some respects is preferred to that shown in the other figures. In this form of my invention I dispense with one of the lower transverse tension-rods, and I support the one which is employed upon a sliding instead of a swinging support.

Referring to the last-mentioned figures, $h$ represents the upper transverse tension-rod, which is mounted and arranged, as is the upper tension-rod, in the form of my invention heretofore described, and $h'$ represents the single lower tension-rod. This is carried by the sliding supports $k^4$, arranged at the ends of the rods 30, which are supported by and arranged to slide in the tubular supports 31 on the frame of the carriage A. The end of the rod 30 opposite the support $k^4$ is connected with a crank-arm $l'$ by means of a link $l^2$. A spring $n$ is arranged between the support 31 and the support $k^4$ for the lower tension-rod, and it tends to force the parts into the positions represented in Fig. 10 and at the right-hand end of Fig. 11—that is, with the tension-rod $h'$ raised and in front of the needle carriers or grippers. This is the normal position of the lower tensioning devices, and when the upper tension-rod is brought down it lies below and slightly forward of the rod $h'$, as shown in the drawings.

$l$ represents a projection, preferably in the form of a roller, carried by the arm $l'$ and arranged to be brought into engagement with an adjustable stop or bracket $m$, secured to the upright frame-piece C. When the carriage A moves toward the embroidery-frame, the roller $l$ comes into engagement with its bracket or stop and forces forward and downward the lower tension-rod and its sliding support, carrying them into the position indicated by dotted lines in Fig. 10, and also at the left-hand end of Fig. 11, where they are out of the way of the needles as they pass through the fabric.

I have discovered that the desired amount of tension may be applied to the thread to properly tighten the stitches on both sides of the fabric by the use of but one set of tensioning devices, and when using the machine with but one set of tensioning devices the carriage opposite thereto may be and preferably is given a shorter movement than is the other carriage—the one which carries the tension devices and whose movement is depended upon to cause the operation of the same. When the machine is being thus operated, however, it is necessary to combine with the carriage having the short movement a take-up device or mechanism for controlling the slack threads, which device, however, is not used to impart tension to the stitches. This arrangement has advantages in that it permits a more rapid operation of the machine than when both carriages are given their full strokes or movements.

I have in the drawings illustrated the machine arranged so that the forward carriage carries the tension devices and has imparted to it a full movement, while the rear carriage is arranged to have but a short movement or reciprocation and has combined with it the take-up devices for the slack thread. When the machine is thus arranged, a removable stop $s^2$, Fig. 1, is secured to the reversing-bar in position to be engaged by the pawl $p$ of the rear carriage whenever it has moved a sufficient distance away from the embroidery-frame. It will be understood that when the pawl of the rear carriage comes into engagement with this stop the reversing-bar is moved, the driving mechanism reversed, and the rear carriage immediately started again in its movement toward the embroidery-frame.

I will next describe the take-up devices which are used in connection with the machine when arranged so that the rear carriage shall have but a short travel, as has been heretofore explained. This part of my invention is indicated in Figs. 11 to 18, inclusive. This take-up device consists of a bar or equivalent device arranged just in front of the material 13, being operated upon and adapted to be made to engage with the several threads, and to be moved away from the needles to take up the slack in the threads as the forward frame or carriage is approaching the material, because it will be understood that when the rear carriage makes but a short travel it does not move sufficiently far to draw the threads through the fabric, and therefore other provision must be made to accomplish this result.

A concise statement of the operation of the machine when arranged so that the rear carriage has but a short movement may now be given. The forward carriage moves forward and back, as usual, properly drawing the threads to the desired degree of tightness by means of its tension device, as described, and at the same time the take-up device operates, drawing the threads and taking up the slack therein as the carriage approaches the fabric and moving in the opposite direction as the carriage recedes from the fabric to give up the threads which it has drawn, and finally releasing them just before the carriage comes to the outer limit of its movement. When the forward carriage is brought to rest adjacent to the fabric and the needles have been transferred to the rear carriage, the latter moves away from the fabric until its pawl $p$ engages with the stop $s^2$, at the same time a short movement being imparted to the take-up apparatus, as will be described, and as soon as the reversing-bar has been operated by the engagement of the pawl $p$ with the stop $s^2$ thereof the driving mechanism is reversed and the rear carriage immediately brought forward toward the fabric, transferring the needles to the forward carriage, which then begins its movement.

An efficient form of take-up device is illustrated and consists of a bar $t$, extending transversely across the machine and suitably mounted so as to travel up and down directly in front of the material being embroidered. This bar is carried by a tube $t'$, which serves to stiffen it, and it has its upper edge notched, as at $t^2$, to receive the threads. Between each pair of notches or recesses $t^2$ I preferably arrange an inclined guide $t^3$, which operates to direct the threads to the recesses as the take-up bar is raised toward the threads. The take-up bar is supported at its opposite ends by the brackets 32, which are secured to belts or drive-chains $v^2$, which pass around the pulleys $v$ and $v^3$ and operate directly to move the take-up bar.

The belts $v^2$ travel adjacent to stationary guide-bars $y$, and the brackets 32 are provided with antifriction guide-rollers 33, which engage with the edges of the guide-bars and cause the take-up bar to have a steady and properly-directed motion.

The take-up bar is driven from one of the shafts 16, upon which is mounted a pulley $u^4$, around which passes a belt 23, connecting it with a pulley 24, mounted upon the shaft 25, which supports the lower turning pulley $v$ for the supporting-belt $v^2$.

It will be understood that whenever the shaft 16 is automatically reversed by the mechanism hereinbefore described in order to change the direction of movement of the carriage A, at the same time the direction of movement of the take-up device will be reversed, and it will be observed that the parts are so related to each other that when the carriage A approaches the fabric the take-up device falls and when it is leaving the fabric it rises.

$v'$, Fig. 17, represents a fence or guard supported upon pulleys on the shafts 16 and 25 and operating to prevent anything from coming accidentally into contact with the belt 23.

In order to confine the threads within the recesses or notches $t^2$ after the take-up bar has been brought into engagement with them, I employ a reciprocating bar $t^4$, Figs. 14, 15, and 16, which is arranged within or beside the bar $t$, and is provided with the pins or bolts $t^5$, which are adapted to be moved across the open ends of the notches $t^2$ and thereby form closed eyes, as shown in Figs. 14 to 16, in which the threads may lie and be confined.

The bar $t^4$ is arranged to have a short lateral movement imparted thereto, and it has connected to one end a rod $z$, which is mounted in a bearing in the bracket 32. A spring $z'$, surrounding the rod $z$, tends to move the bar $t^4$ into position to carry the pins $t^5$ across the open ends of the recesses $t^2$.

For opening the recesses $t^2$ in order to permit the free entrance of the threads thereinto I provide the rod $z$ with an antifriction-roller 29, which is adapted, as the take-up bar is approaching its upper limit of motion and just before it reaches the threads, to engage with a cam $y'$, pivotally supported upon a bracket 28, which is adjustably secured to one of the guide-bars $y$. The incline or cam $y'$ is so arranged that when the take-up bar descends the roller 29 passes inside of it, the passage being free by reason of the fact that the cam is pivoted. The cam is held by the weight $y^2$ with its lower end normally against the guide-bar $y$.

As the threads decrease in length each time they are passed through the fabric, I make provision for automatically shortening the travel of the take-up device at each successive movement thereof, because, as will be apparent, a less travel will be required for a short thread than for a longer one. To this end the pulley $u^4$, which is mounted upon the shaft 16 and drives the take-up device, is mounted loosely upon its shaft, but is held thereon by a friction device 34, Fig. 18, so that under all ordinary circumstances the pulleys $u^4$ turns with the shaft as though rigidly secured thereto.

$u^3$, Figs. 17 and 18, represents a ratchet-wheel, which is secured to the pulley $u^4$, and $u^2$ represents a stopping-pawl, which may be brought into engagement with the ratchet-wheel $u^3$ and positively prevent its turning, consequently stopping the pulley $u^4$ and the other driving devices for the take-up mechanism.

In order to automatically operate this stop-pawl, I mount it upon a lever $u'$, which is preferably fulcrumed upon the shaft 16 or upon a hub $u$, secured thereto, as shown in Fig. 18.

A sliding bar 20 is connected with the end of the lever $u'$, and a weight 22, acting upon the said bar, tends always to draw the lever into that position which carries the pawl $u^2$ away from the ratchet-wheel. The pawl is weighted, so that it tends to engage with the ratchet-wheel; but a pin 21 upon the frame of the machine holds it out of engagement with the wheel whenever the weight draws the rod 20 into its normal position.

$w$ is a contact-arm carried by the forward carriage A and adapted to engage with an adjustable stop $x$, mounted upon the rod 20, as the carriage is approaching the fabric and to move the rod in the direction indicated by the arrow in Fig. 17. This movement of the rod 20 rocks the lever $u'$, which is connected to it, and carries the pawl $u^2$ out of engagement with the pin 21, so that the pawls fall into engagement with the ratchet-wheel $u^3$. As soon as this engagement takes place, the further movement of the rod 20 and the lever $u'$ is communicated through the pawl $u^2$ to the ratchet-wheel, so that there is given a slight backward movement to the ratchet-wheel, carrying with it the pulley $u^4$ and the parts of the take-up device which are driven thereby. The reason for giving this backward movement is that there may be sufficient slack imparted to the threads to permit the rear carriage to have its short movement without unduly drawing upon them, as indicated in Fig. 12.

It will be seen that by means of the apparatus which I have last described the downward movement of the take-up device is shortened slightly at each reciprocation of the carriages, and by this means I compensate for the shortening of the thread as the design is being worked into the fabric.

It is to be understood that the take-up device which I have described is not used for the purpose of imparting the requisite tension to the threads, but merely to carry the threads out of the way of the approaching needles to prevent entanglement, &c. It not only operates in an efficient manner to do this, but at the same time it always insures sufficient slack being imparted to the thread to permit the rear carriage to make its short reciprocation. The take-up device rises when the front carriage resumes its motion away from the embroidery-frame and while the threads are being pulled through the fabric; but before the stitches are finished it releases the threads, to again engage therewith as the threads are being drawn to their extreme outward positions.

I prefer to duplicate the toothed bar $s$ and the pawls which engage therewith upon the side of the machine opposite to that shown in Fig. 1 in order to balance the motions of the carriages. This bar need not have the connection with the reversing-clutch $a^3$, but is held in the required positions by means of a governing-lever Q and weight Q', Figs. 1, 2, and 3, carried thereby, the lever being pivoted to the frame of the machine and connected with the bar by a pin.

I claim—

1. In an embroidering machine, the combination with the carriage for the needles, of a driving shaft 16 for the carriage, a gear pinion and delay shoe mounted thereon, a wheel for driving said pinion provided with a delay surface, with which the said delay shoe is adapted to engage, means for driving the said wheel, and means for reversing the driving mechanism, substantially as set forth.

2. In an embroidering machine, the combination with the two carriages which carry the needles, of the driving shafts 16 for the carriages, the gear pinions and delay shoes upon the said shafts, a single wheel $d$ provided with two mutilated gear sections for driving the said gear pinions, and with two delay surfaces for the delay shoes, means for driving the said wheel, and a reversing mechanism, substantially as set forth.

3. In an embroidering machine, the combination with the two carriages for the needles, of the driving shafts for the carriages, the pinions thereon, a single driving wheel provided with two mutilated gear sections for driving the said pinions, a worm wheel and gear which drives the said gear wheel, driving mechanism for the worm gear, and a reversing mechanism, substantially as set forth.

4. The combination of the two carriages, the needle grippers or holders mounted thereon, the driving shafts for the carriages, the pinions and the delay shoes on said shafts, a wheel $d$ provided with two mutilated gear sections for driving the wheels, two delay rims for engagement with the delay shoes, and with a cam $g$, a tilting lever driven from the said cam, the means for opening and closing the needle grippers upon the two carriages, and the rods connected with the said means and arranged to come into engagement with the said tilting lever as the carriages approach the fabric, and to be operated by this lever, substantially as set forth.

5. In an embroidering machine, the combination of the two carriages arranged to travel upon the frame toward and from the fabric being embroidered, driving mechanism therefor, including means for positively moving the carriages backward and forward, engaging delay surfaces which serve to positively lock the carriages, the said delay surfaces being so disposed relative to the parts of the mechanism for moving the carriages that the carriages are locked thereby when they are at their inward limits of motion, and mechanism for operating the needle grippers while the carriages are thus locked, whereby the needles are transferred from one set of grippers to the other while the carriages are positively held by the said driving mechanism, substantially as set forth.

6. In an embroidering machine, the combination with the carriages and the driving mechanism therefor arranged to give motion to the carriages both toward and away from the fabric, of an automatic reversing mechanism comprising a reversing bar on the frame of the machine connected with the driving mechanism, and contact pieces carried by the carriages arranged to be brought into engagement with the bar and to move the same as the carriages approach the limits of their outward movements, substantially as set forth.

7. In an embroidering machine, the combination with the carriage and the driving mechanism arranged to give motion to the carriage both toward and away from the fabric, of a reversing clutch, a reversing bar connected with the clutch, the pawl or contact arm carried by the carriage and adapted to be brought into engagement with the reversing bar, and means for holding such contact arm out of engagement with the reversing bar until the carriage approaches the limit of its outward movement, substantially as set forth.

8. In an embroidering machine, the combination with the carriage and its driving mechanism arranged to give motion to the carriage both toward and away from the fabric, of the reversing mechanism for said driving mechanism, the tension device for imparting tension to the threads, and a lever between the tension device and the reversing mechanism, arranged to operate the reversing mechanism whenever the tension device operates to put the requisite tension upon the threads, substantially as set forth.

9. In an embroidering machine, the combination with the carriage, the driving mechanism arranged to give motion to the carriage both toward and away from the fabric, and a reversing clutch, of a reversing bar connected with the said clutch and having a serrated or toothed portion, a pawl carried by the carriage and arranged to engage with such toothed portion of the bar and mechanism upon the carriage arranged to automatically move the said pawl out of and into engagement with the reversing bar whereby the carriage may be automatically reversed, substantially as set forth.

10. In an embroidering machine, the combination with the carriages, the driving mechanism and the reversing clutch, of a reversing bar connected with the said clutch and having its ends serrated or toothed and its central portion plain, pawls carried by the carriages and arranged to engage with the said bar, and a tension device for the threads arranged when bearing upon the threads and in one extreme position, to move the pawls from off the reversing bar, substantially as set forth.

11. In an embroidering machine, the combination with the carriage and the needle holders, of the tension device consisting of a transverse tension rod arranged to serve as a support for the threads, another tension rod arranged to be brought to bear upon the threads, and means for holding the supporting tension rod in position, the other tension rod bearing upon the threads with a yielding pressure and having a limited amount of free movement, whereby the yielding tension rod is moved and the tension is applied to the threads as the carriage approaches its outward limit of movement, substantially as set forth.

12. In an embroidering machine, the combination with the needle holders or grippers, of the tension device consisting of a transverse supporting rod for the threads mounted upon a sliding support, adapted, when moved, to carry the rod out of the way of the needles, means for normally holding the rod in engagement with the threads, a tension rod arranged to rest upon the threads with a yielding force, and means for moving the tensioning devices away from in front of the needles as they approach the fabric, substantially as set forth.

13. In an embroidering machine, the combination with the carriage, the driving mechanism therefor arranged to give motion to the carriage both toward and away from the fabric and a reversing clutch for the driving mechanism of a reversing bar, a tension device arranged to bear upon the threads with a yielding pressure whereby, when the carriage moves away from the fabric and stretches the threads the tension device is moved, thereby applying tension to the threads, and a pawl mounted upon the carriage and arranged to engage with the reversing bar, and having an arm with which the tension device engages so as to raise the pawl whenever it is in position upon the threads, substantially as set forth.

14. In an embroidering machine, the combination with the carriages, the driving mechanism therefor, and the reversing clutch, of a reversing bar connected with the reversing clutch, the contact pieces carried by the carriages and arranged to engage with and move the reversing bar, a stop secured to the reversing bar behind one of the carriages and arranged to be engaged by the contact piece thereof, whereby the said carriage is stopped and the reversing clutch operated after the carriage has made but a short travel, and a take-up device arranged to engage with the threads and to move away from the needles as the carriage having the longer movement approaches the embroidering frame, thereby preventing entanglement of the threads, substantially as set forth.

15. In an embroidering machine, the combination with the carriages, the driving mechanism therefor, and the reversing clutch, of a reversing bar connected with the reversing clutch, the contact pieces carried by the carriages and arranged to engage with and move the reversing bar, a stop secured to the reversing bar behind one of the carriages and arranged to be engaged by the contact piece thereof, whereby the said carriage is stopped, and the reversing clutch operated when the carriage has made a relatively short travel, a take-up device for the threads, and means for imparting to the take-up device a short backward movement, while the carriage having the shorter movement is receding from the fabric, substantially as set forth.

16. In an embroidering machine, the combination with the carriages, of a reciprocating take-up device for the threads and the driving mechanism therefor, and means for turning back the mechanism for a short distance, operated by one of the carriages as it approaches the fabric, substantially as set forth.

17. The combination with the carriages, of the take-up for the threads, driving mechanism for reciprocating the take-up having frictional connection with its driving shaft, and means for positively reversing or turning backward such driving mechanism without stopping its driving shaft, substantially as set forth.

18. The combination with the carriages, and the driving mechanism therefor, of the take-up device for the threads, the driving mechanism for reciprocating the take-up device, connected with the driving mechanism for the carriage, and a stop for arresting the forward movement of the take-up driving device before the carriage reaches its position nearest the fabric, substantially as set forth.

19. The combination with the carriage, of the reciprocating take-up, the driving shaft 16, a wheel $u^4$ mounted thereon and held so as to turn therewith by friction devices, and serving to impart motion to the take-up supports, a ratchet wheel connected with the said wheel $u^4$, a lever carrying a pawl adapted to engage with the said ratchet wheel and to positively stop it and the wheel $u^4$ from rotation with the driving shaft, means carried by the carriage for operating the said lever and pawl as the carriage approaches the fabric and means for moving the lever and pawl out of engagement with the ratchet wheel, substantially as set forth.

In testimony whereof I have signed my name to this specification in the presence of two subscribing witnesses.

ALEX. GASS.

Witnesses:
MOFFET DICKSON,
HUGH HINDMAN.